United States Patent [19]
Dove

[11] Patent Number: 5,998,951
[45] Date of Patent: Dec. 7, 1999

[54] VEHICULAR ELECTRIC WINDOW SAFETY SWITCH

[76] Inventor: James H. Dove, 228 S. Queen St., Kinston, N.C. 28501

[21] Appl. No.: 09/057,753

[22] Filed: Apr. 9, 1998

[51] Int. Cl.$^6$ .................................................. H02P 1/00
[52] U.S. Cl. ........................ 318/282; 318/466; 318/479; 49/28
[58] Field of Search .................... 318/264–266, 318/280–300, 445–489; 49/26–28

[56] References Cited

U.S. PATENT DOCUMENTS

| | | | |
|---|---|---|---|
| 1,691,729 | 11/1928 | Meyers . | |
| 3,018,851 | 1/1962 | Diamond et al. . | |
| 4,753,323 | 6/1988 | Kahkipuro | 187/317 |
| 5,079,417 | 1/1992 | Strand | 49/26 |
| 5,081,406 | 1/1992 | Hughes et al. | 318/478 |
| 5,164,709 | 11/1992 | Lamberty et al. | 340/667 |
| 5,285,136 | 2/1994 | Duhame | 318/266 |
| 5,621,290 | 4/1997 | Heller et al. | 318/466 |

Primary Examiner—David Martin

[57] ABSTRACT

A new vehicular electric window safety switch for stopping the closing of an electric powered window of a vehicle when an obstruction, such as a finger or a hand, is detected between the glass of the window and the window frame. The inventive device includes an elongate member having a base portion, and a lip portion. The base portion has opposite first and second sides and is resiliently compressible between the first and second sides of the base portion. The lip portion is extended from the first side of the base portion. The elongate member is designed for attachment to a window frame of a electric powered window such that the lip portion and the first side of the base portion are adapted for abutting against the window frame of the electric powered window. The base portion has an interior space extending between the ends of the elongate member. A pair of elongate electrically conductive strips are provided in the interior space of the base portion. The strips are spaced apart from one another. Each of the strips is adapted for electrical connection to the control mechanism of an electric powered window. In use, closing of an electric powered window is stopped when the first and second sides of the base portion are compressed together such that the strips in the interior space of the base portion come into contact with each other.

8 Claims, 2 Drawing Sheets

VEHICULAR ELECTRIC WINDOW SAFETY SWITCH

BACKGROUND OF THE INVENTION

1. Field of the Invention

The present invention relates to electric powered windows for vehicles and more particularly pertains to a new vehicular electric window safety switch for stopping the closing of an electric powered window of a vehicle when an obstruction, such as a finger or a hand, is detected between the glass of the window and the window frame.

2. Description of the Prior Art

The use of electric powered windows for vehicles is known in the prior art. More specifically, electric powered windows for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art electric powered windows for vehicles include U.S. Pat. No. 5,621,290; U.S. Pat. No. 5,285,136; U.S. Pat. No. 5,081,406; U.S. Pat. No. 5,164,709; U.S. Pat. No. 1,691,729; and U.S. Pat. No. 3,018,851.

While these devices fulfill their respective, particular objectives and requirements, the aforementioned patents do not disclose a new vehicular electric window safety switch. The inventive device includes an elongate member having a base portion, and a lip portion. The base portion has opposite first and second sides and is resiliently compressible between the first and second sides of the base portion. The lip portion is extended from the first side of the base portion. The elongate member is designed for attachment to a window frame of a electric powered window such that the lip portion and the first side of the base portion are adapted for abutting against the window frame of the electric powered window. The base portion has an interior space extending between the ends of the elongate member. A pair of elongate electrically conductive strips are provided in the interior space of the base portion. The strips are spaced apart from one another. Each of the strips is adapted for electrical connection to the control mechanism of an electric powered window. In use, closing of an electric powered window is stopped when the first and second sides of the base portion are compressed together such that the strips in the interior space of the base portion come into contact with each other.

In these respects, the vehicular electric window safety switch according to the present invention substantially departs from the conventional concepts and designs of the prior art, and in so doing provides an apparatus primarily developed for the purpose of stopping the closing of an electric powered window of a vehicle when an obstruction, such as a finger or a hand, is detected between the glass of the window and the window frame.

SUMMARY OF THE INVENTION

In view of the foregoing disadvantages inherent in the known types of electric powered windows for vehicles now present in the prior art, the present invention provides a new vehicular electric window safety switch construction wherein the same can be utilized for stopping the closing of an electric powered window of a vehicle when an obstruction, such as a finger or a hand, is detected between the glass of the window and the window frame.

The general purpose of the present invention, which will be described subsequently in greater detail, is to provide a new vehicular electric window safety switch apparatus and method which has many of the advantages of the electric powered windows for vehicles mentioned heretofore and many novel features that result in a new vehicular electric window safety switch which is not anticipated, rendered obvious, suggested, or even implied by any of the prior art electric powered windows for vehicles, either alone or in any combination thereof.

To attain this, the present invention generally comprises an elongate member having a base portion, and a lip portion. The base portion has opposite first and second sides and is resiliently compressible between the first and second sides of the base portion. The lip portion is extended from the first side of the base portion. The elongate member is designed for attachment to a window frame of a electric powered window such that the lip portion and the first side of the base portion are adapted for abutting against the window frame of the electric powered window. The base portion has an interior space extending between the ends of the elongate member. A pair of elongate electrically conductive strips are provided in the interior space of the base portion. The strips are spaced apart from one another. Each of the strips is adapted for electrical connection to the control mechanism of an electric powered window. In use, closing of an electric powered window is stopped when the first and second sides of the base portion are compressed together such that the strips in the interior space of the base portion come into contact with each other.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular electric window safety switch apparatus and method which has many of the advantages of the electric powered windows for vehicles mentioned heretofore and many novel features that result in a new vehicular electric window safety switch which is not anticipated, rendered obvious, suggested, or even implied by any of the prior art electric powered windows for vehicles, either alone or in any combination thereof.

It is another object of the present invention to provide a new vehicular electric window safety switch which may be easily and efficiently manufactured and marketed.

It is a further object of the present invention to provide a new vehicular electric window safety switch which is of a durable and reliable construction.

An even further object of the present invention is to provide a new vehicular electric window safety switch which is susceptible of a low cost of manufacture with regard to both materials and labor, and which accordingly is then susceptible of low prices of sale to the consuming public, thereby making such vehicular electric window safety switch economically available to the buying public.

Still yet another object of the present invention is to provide a new vehicular electric window safety switch which provides in the apparatuses and methods of the prior art some of the advantages thereof, while simultaneously overcoming some of the disadvantages normally associated therewith.

Still another object of the present invention is to provide a new vehicular electric window safety switch for stopping the closing of an electric powered window of a vehicle when an obstruction, such as a finger or a hand, is detected between the glass of the window and the window frame.

Yet another object of the present invention is to provide a new vehicular electric window safety switch which includes an elongate member having a base portion, and a lip portion. The base portion has opposite first and second sides and is resiliently compressible between the first and second sides of the base portion. The lip portion is extended from the first side of the base portion. The elongate member is designed for attachment to a window frame of a electric powered window such that the lip portion and the first side of the base portion are adapted for abutting against the window frame of the electric powered window. The base portion has an interior space extending between the ends of the elongate member. A pair of elongate electrically conductive strips are provided in the interior space of the base portion. The strips are spaced apart from one another. Each of the strips is adapted for electrical connection to the control mechanism of an electric powered window. In use, closing of an electric powered window is stopped when the first and second sides of the base portion are compressed together such that the strips in the interior space of the base portion come into contact with each other.

Still yet another object of the present invention is to provide a new vehicular electric window safety switch that prevents fingers from being injured when caught between a powered window and the window frame when the powered window is shut.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
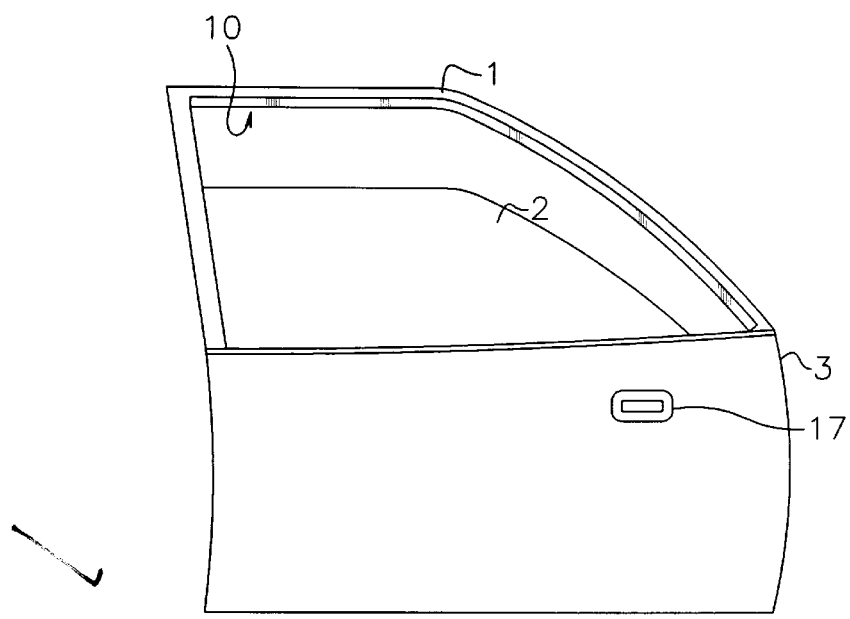
FIG. 1 is a schematic side view of a new vehicular electric window safety switch on a vehicular door having an electric powered window according to the present invention.

With reference now to the drawings, and in particular to FIGS. 1 through 4 thereof, a new vehicular electric window safety switch embodying the principles and concepts of the present invention and generally designated by the reference numeral 10 will be described.

As best illustrated in FIGS. 1 through 4, the vehicular electric window safety switch 10 generally comprises an elongate member 12 having a base portion 15, and a lip portion 16. The base portion 15 has opposite first and second sides 21,22 and is resiliently compressible between the first and second sides 21,22 of the base portion 15. The lip portion 16 is extended from the first side 21 of the base portion 15. The elongate member 12 is designed for attachment to a window frame 1 of a electric powered window 2 such that the lip portion 16 and the first side 21 of the base portion 15 are adapted for abutting against the window frame 1 of the electric powered window. The base portion 15 has an interior space 20 extending between the ends 13,14 of the elongate member 12. A pair of elongate electrically conductive strips 18,19 are provided in the interior space 20 of the base portion 15. The strips 18,19 are spaced apart from one another. Each of the strips 18,19 is adapted for electrical connection to the control mechanism of an electric powered window 2. In use, closing of an electric powered window 2 is stopped when the first and second sides 21,22 of the base portion 15 are compressed together between the window frame 1 and the window 2 such that the strips 18,19 in the interior space 20 of the base portion 15 come into contact with each other.

In use, the safety switch 10 is designed for helping prevent injury to body parts such as fingers caught between the window frame 1 and an upwardly closing electric powered window 2, such as of the type found in vehicles and commonly known as powered windows. In closer detail, the safety switch is designed for mounting to a window frame 1 of an electric powered window 2, as illustrated in FIG. 1 on a window frame 1 of a electric powered window 2 of a door 3 of a vehicle.

Figure 2:
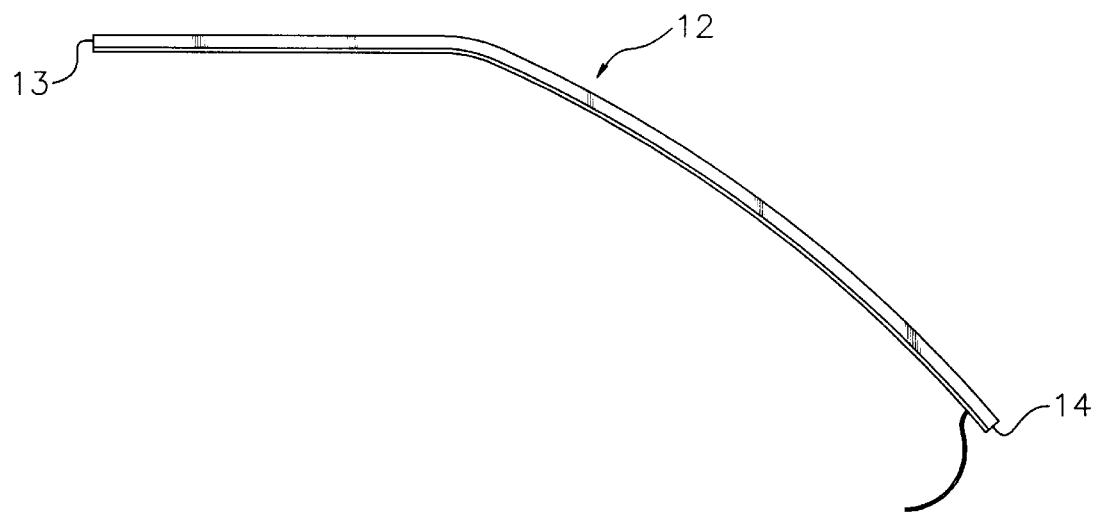
FIG. 2 is a schematic side view of the present invention.
Figure 3:
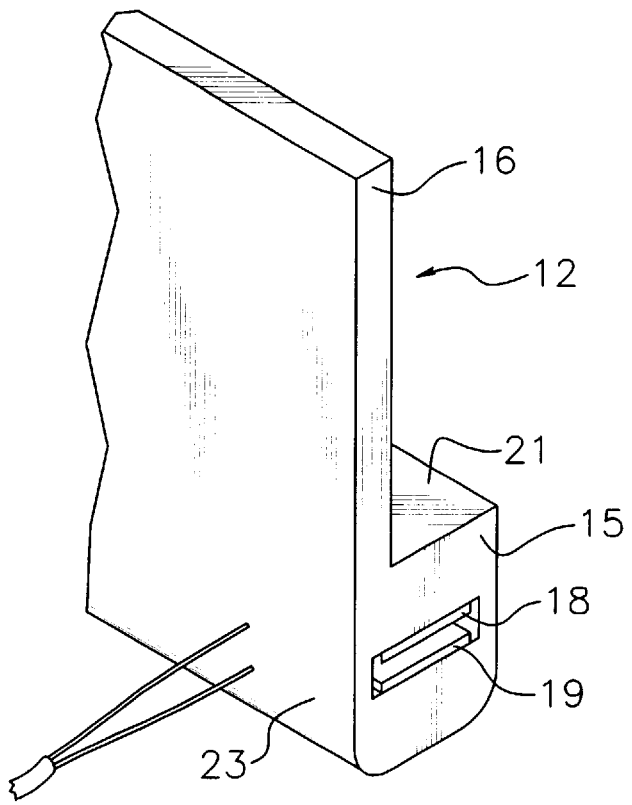
FIG. 3 is a schematic partial perspective view of the present invention.
Figure 4:
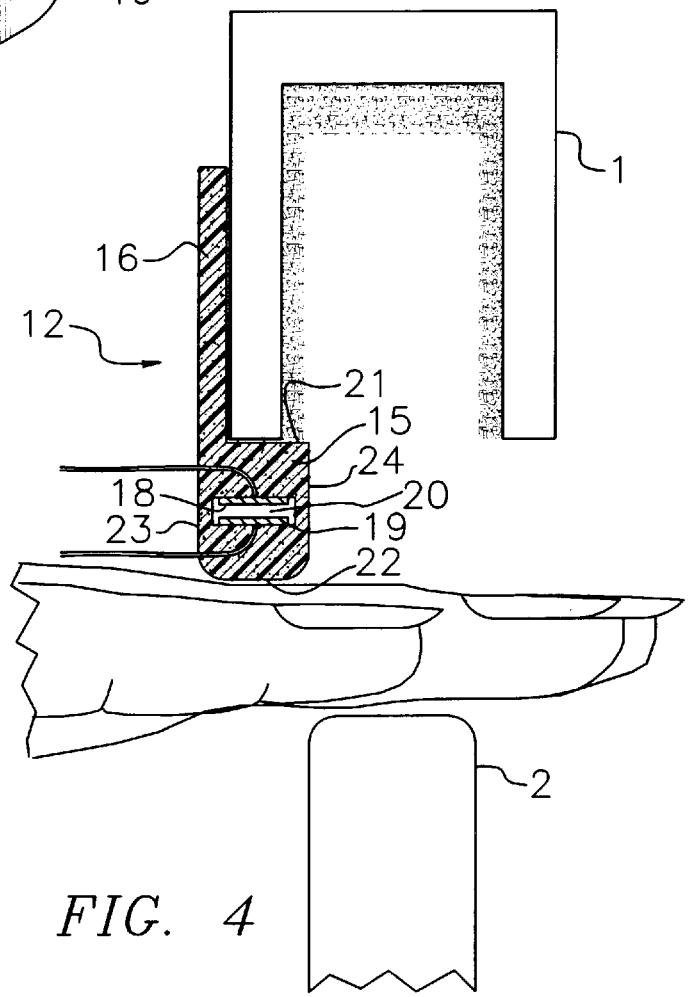
FIG. 4 is a schematic sectional view of the present invention in use.

As depicted in FIGS. 2 and 3, the elongate member 12 has a pair of opposite ends 13,14. The elongate member also has an elongate base portion 15, and an elongate lip portion 16. The lengths of the base and lip portion 16 are extended between the ends 13,14 of the elongate member 12. Preferably, the elongate member 12 is flexible to permit fitting the elongate member 12 along the contour of a window frame 1 of an electric powered window 2. With reference to FIGS. 3 and 4, the base portion 15 preferably has a generally rectangular cross section taken perpendicular to the length of the base portion 15. The base portion 15 has opposite first and second sides 21,22, and opposite third and fourth sides 23,24 extending between the first and second sides 21,22 of the base portion 15. The elongate member 12 comprises a resiliently compressible material, such as rubber, so that the base portion 15 is resiliently compressible between the first and second sides 21,22 of the base portion 15. The lip portion 16 is preferably perpendicularly extended from the first side 21 of the base portion 15. The lip portion 16 is also preferably positioned adjacent the third side 23 of the base portion 15. As shown in FIG. 4, the elongate member 12 is designed for attachment to a window frame 1 of a electric powered window 2 such that the lip portion 16 and the first side 21 of the base portion 15 abut against the window frame 1 of the electric powered window 2.

The base portion 15 has an elongate interior space 20 which extends between the ends 13,14 elongate member 12. Preferably, the interior space 20 has a generally rectangular cross section taken perpendicular to the length of the interior space 20. A pair of elongate electrically conductive strips 18,19 are provided in the interior space 20 of the base portion 15 with he lengths of the strips 18,19 extending between the ends 13,14 of the elongate member 12. The strips 18,19 are spaced apart from one another and also face one another with one of the strips 18 positioned towards the first side 21 of the base portion 15 and the other strip 19 positioned towards the second side 22 of the base portion 15. Each of the strips 18,19 is adapted for electrical connection to the control mechanism of an electric powered window 2.

In use, closing of the electric powered window is stopped when the first and second sides 21,22 of the base portion 15 are compressed together such that the strips 18,19 in the interior space 20 of the base portion 15 come into contact with each other to complete an electric circuit. Ideally, a master switch 17 is provided for deactivating the safety switch device. The master switch 17 is electrically connected to the strips 18,19. The master switch is designed for electrical connection to the control mechanism of an electric powered window to over-ride the electrical connection formed between the strips 18,19 when in contact with each other. This way, the electric powered window 2 may be closed when the first and second sides 21,22 of the base portion 15 are compressed together so that the strips 18,19 come into contact with each other. In this ideal embodiment, it is also preferred that an auto reverse device be provided for reversing the direction of a closing electric powered wind, that is further opening the window. The auto reverse device is designed for electrical connection to the control mechanism of an electric powered window 2 such that the electric powered window 2 is opened when the strips 18,19 come into contact with each other. This way, if a user's fingers are trapped between the window and the window frame as the window is closing, the auto reverse device will reverse the direction of the window (i.e. open it) to free the fingers from between the frame and the window.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for mounting to a window frame of an electric powered window, said device comprising:

an elongate member having a pair of opposite ends, a base portion, and a lip portion;

said base portion having opposite first and second sides;

said base portion being resiliently compressible between said first and second sides of said base portion;

said lip portion being extended from said first side of said base portion;

said elongate member being adapted for attachment to a window frame of a electric powered window such that said lip portion and said first side of said base portion are adapted for abutting against the window frame of the electric powered window;

said base portion having an interior space, said interior space of said base portion extending between said ends elongate member;

a pair of elongate electrically conductive strips being provided in said interior space of said base portion, the lengths of said strips being extended between said ends of said elongate member, said strips being spaced apart from one another and facing one another, one of said strips being positioned towards said first side of said base portion, the other of said strip being positioned towards said second side of said base portion;

each of said strips being adapted for electrical connection to the control mechanism of an electric powered window; and wherein closing of the electric powered window is stopped when said first and second sides of said base portion are compressed together such that said strips in said interior space of said base portion come into contact with each other.

2. The device of claim 1, wherein said elongate member is flexible to permit fitting said elongate member along the contour of a window frame of an electric powered window.

3. The device of claim 1, wherein said base portion has a generally rectangular cross section and has opposite third and fourth sides extending between said first and second sides of said base portion.

4. The device of claim 3, wherein said lip portion is positioned adjacent said third side of said base portion.

5. The device of claim 1, wherein said lip portion is perpendicularly extended from said first side of said base portion.

6. The device of claim 1, further comprising a master switch electrically connected to said strips and being adapted for electrical connection to the control mechanism of an electric powered window such that the electric powered may be closed when first and second sides of said base portion are compressed together such that said strips come into contact with each other.

7. The device of claim 1, further comprising an auto reverse device for opening an electric powered window that is being closed, said auto reverse device being adapted for electrical connection to the control mechanism of an electric powered window such that the electric powered window is opened when said strips come into contact with each other.

8. A device for mounting to a window frame of an electric powered window, said device comprising:

an elongate member having a pair of opposite ends, a base portion, and a lip portion;

said elongate member being flexible to permit fitting said elongate member along the contour of a window frame of an electric powered window;

said base portion having a generally rectangular cross section and having opposite first and second sides, and opposite third and fourth sides extending between said first and second sides of said base portion;

wherein said elongate member comprises a resiliently compressible material, said base portion being resiliently compressible between said first and second sides of said base portion;

said lip portion being perpendicularly extended from said first side of said base portion, said lip portion being positioned adjacent said third side of said base portion;

said elongate member being adapted for attachment to a window frame of a electric powered window such that said lip portion and said first side of said base portion are adapted for abutting against the window frame of the electric powered window;

said base portion having an interior space, said interior space of said base portion extending between said ends elongate member, said interior space having a generally rectangular cross section;

a pair of elongate electrically conductive strips being provided in said interior space of said base portion, the lengths of said strips being extended between said ends of said elongate member, said strips being spaced apart from one another and facing one another, one of said strips being positioned towards said first side of said base portion, the other of said strip being positioned towards said second side of said base portion;

each of said strips being adapted for electrical connection to the control mechanism of an electric powered window;

wherein closing of the electric powered window is stopped when said first and second sides of said base portion are compressed together such that said strips in said interior space of said base portion come into contact with each other;

a master switch electrically connected to said strips and being adapted for electrical connection to the control mechanism of an electric powered window such that the electric powered may be closed when first and second sides of said base portion are compressed together such that said strips come into contact with each other; and an auto reverse device for opening an electric powered window that is being closed, said auto reverse device being adapted for electrical connection to the control mechanism of an electric powered window such that the electric powered window is opened when said strips come into contact with each other.

\* \* \* \* \*